(12) United States Patent
Arai et al.

(10) Patent No.: US 6,754,090 B2
(45) Date of Patent: Jun. 22, 2004

(54) AC/DC/HFAC/DC/AC POWER SUPPLY

(75) Inventors: Toru Arai, Kyoto (JP); Makoto Sakurada, Yao (JP); Yoshiyuki Nishioka, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 0 days.

(21) Appl. No.: 10/222,068

(22) Filed: Aug. 16, 2002

(65) Prior Publication Data

US 2003/0035305 A1 Feb. 20, 2003

(30) Foreign Application Priority Data

Aug. 17, 2001  (JP) ........................................ 2001-248316

(51) Int. Cl.[7] .............................................. H02H 3/335
(52) U.S. Cl. .............................. 363/17; 363/37; 363/71
(58) Field of Search .............................. 363/17, 37, 71

(56) References Cited

U.S. PATENT DOCUMENTS

| | | | | |
|---|---|---|---|---|
| 4,024,451 A | * | 5/1977 | Nishino et al. | |
| 4,719,550 A | * | 1/1988 | Powell et al. | 363/37 |
| 5,134,307 A | * | 7/1992 | Nakano | 363/17 |
| 5,291,383 A | * | 3/1994 | Oughton | 363/17 |
| 5,546,295 A | * | 8/1996 | Prete et al. | 363/71 |
| 5,625,539 A | * | 4/1997 | Nakata et al. | 363/17 |
| 5,771,163 A | * | 6/1998 | Moriguchi et al. | 363/71 |
| 5,930,122 A | * | 7/1999 | Moriguchi et al. | 363/17 |
| 6,181,576 B1 | * | 1/2001 | Ikeda et al. | 363/17 |
| 6,288,916 B1 | * | 9/2001 | Liu et al. | 363/37 |
| 6,404,655 B1 | * | 6/2002 | Welches | 363/17 |
| 6,515,878 B1 | * | 2/2003 | Meins et al. | 363/37 |
| 6,535,399 B2 | * | 3/2003 | Gu | 363/17 |

* cited by examiner

Primary Examiner—Jeffrey Sterrett
(74) Attorney, Agent, or Firm—Duane Morris LLP

(57) ABSTRACT

A power supply apparatus for use in electroplating includes an input-side rectifier (32). A rectifier output is converted into high-frequency signals in inverters (38a, 38b), which are transformed in transformers (48a, 48b). When the transformed high-frequency signals from the transformers are of positive polarity, they are rectified by a diode (50a or 50b) to cause a positive current to be supplied to a load (60). When the transformed high-frequency signals are of negative polarity, they are rectified by a diode (50c or 50d) to thereby cause a negative current to flow through the load. A first IGBT (54a) is connected in series with each of the diodes (50a, 50b) and is rendered conductive and nonconductive at a frequency lower than the high-frequency signal. Also, a second IGBT (54b) is connected in series with each of the diodes (50c and 50d) and is rendered nonconductive when the IGBT and nonconductive at the lower frequency. When the first IGBT is rendered conductive, the second IGBT is rendered nonconductive, and vice versa. The inverters (38a, 38b) are controlled in synchronization with the first and second IGBTs (54a, 54b) in such a manner that the high-frequency signal can have a larger magnitude when the second IGBT (54b) is conductive than when the first IGBT (54a) is conductive.

6 Claims, 3 Drawing Sheets

FIG. 1
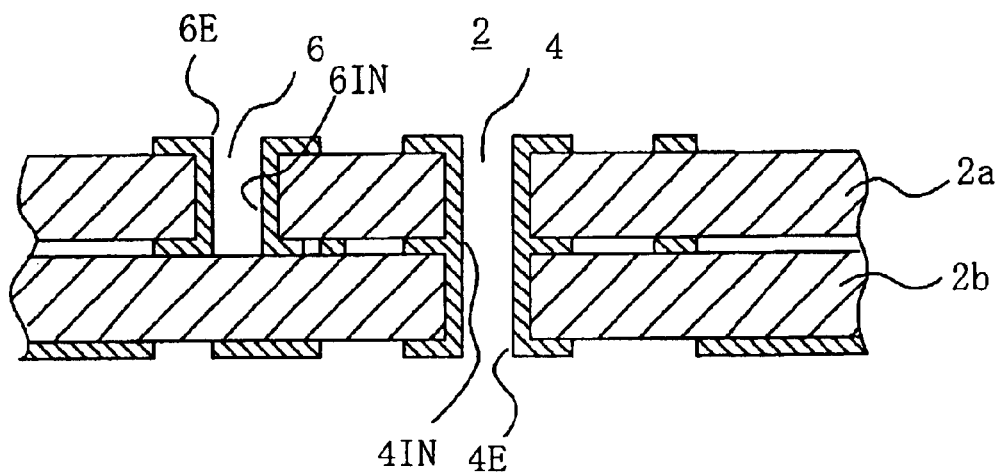
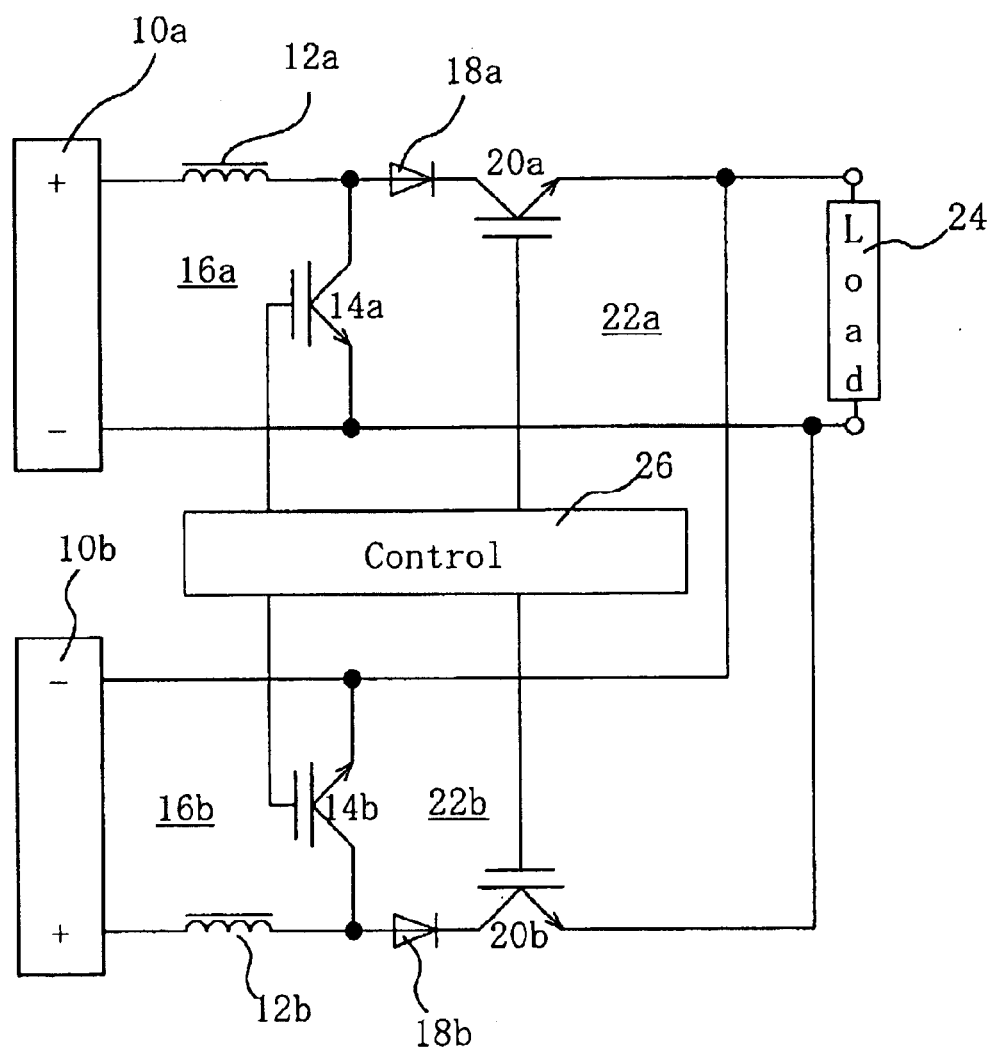
FIG. 2 PRIOR ART

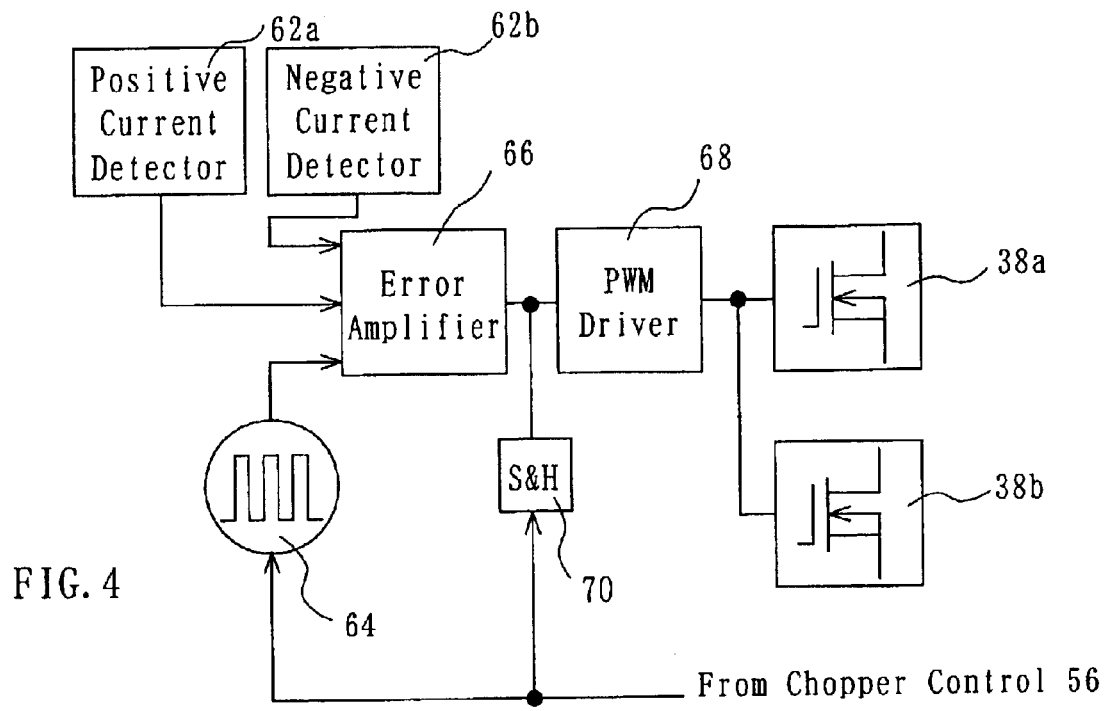
FIG. 4
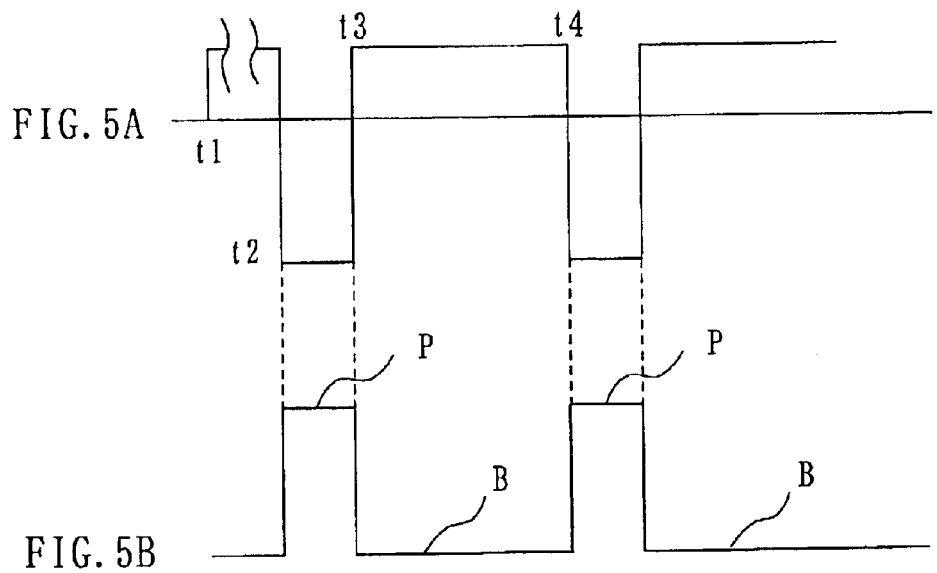
FIG. 5A
FIG. 5B

US 6,754,090 B2

AC/DC/HFAC/DC/AC POWER SUPPLY

This invention relates to a power supply apparatus for use in electroplating, for supplying current to a load including an object to be plated, an electrolytic solution and electrodes, to thereby plate the object. (In this specification, this type of power supply apparatus is referred to as electroplating power supply apparatus, and the load is referred to as plating load.)

BACKGROUND OF THE INVENTION

In electroplating, it is known to invert, at a high speed, the polarity of current supplied to a plating load. When current with the positive polarity is being supplied to the plating load, plating takes place, and when the current of the negative polarity is being supplied to the load, the plating is interrupted or part of the metal forming a plated layer is dissolved back into the electrolyte solution, whereby crystals forming the plated layer are made finer so that the object can be uniformly plated.

When a multi-layered printed circuit board 2, like the one shown in FIG. 1, is plated, some problems have happened. The multi-layered printed circuit board 2 includes substrates 2a and 2b, for example, on which electronic components are integrated to a high density. The circuit board 2 are provided with a number of through-holes like a through-hole 4, and a number of via-holes, like a via-hole 6. As the number of layered substrates is larger, the difference in thickness between plated metal layers on an edge 4E and an inner wall 4IN of the through-hole 4 becomes larger, resulting in non-uniform plating. In other words, it is difficult to uniformly plate the through-holes 4. Similarly, as the number of substrates increases, the difference in thickness between plated metal layers on an edge 6E and an inner wall 6IN of the via-hole 6 becomes larger, which results in non-uniform plating. It has been found that in order to form a plated metal layer uniform in thickness over the entire surfaces of the substrates 2a and 2b, it is necessary to make a negative-polarity plating current of sufficiently larger magnitude flow for a shorter time period than a positive-polarity plating current.

In Japanese Patent Application No. HEI 10-281954 on Sep. 17, 1998 (Japanese Patent Application Publication No. 2000-92841), inventors including one of the inventors of the present invention proposed an electroplating power supply apparatus which supplies current having a polarity inverted at intervals of, for example, from 5 to 20 milliseconds, to a plating load, to thereby form a layer of uniform thickness over a plating load including a plurality of substrates, such as a multi-layered printed circuit board. The apparatus of this Japanese patent application is shown in FIG. 2.

The power supply apparatus shown in FIG. 2 includes DC power supplies 10a and 10b, voltage-boosting converters 16a and 16b, and choppers 22a and 22b, for supplying a plating load 24 with current alternating between positive and negative polarities. The voltage-boosting converter 16a includes a reactor 12a and an IGBT 14a, and the voltage-boosting converter 16b includes a reactor 12b and an IGBT 14b. The chopper 22a includes a reverse current blocking diode 18a and an IGBT 20a, while the chopper 22b includes a reverse current blocking diode 18b and an IGBT 20b. The IGBTs 14a, 14b, 20a and 20b are controlled by a controller 26.

For example, when the IGBTs 20a and 14b are nonconductive and the IGBTs 20b and 14a are conductive, current flows through the DC supply 10a, the reactor 12a and the IGBT 14a, resulting in storage of energy in the reactor 12a. At the same time, a negative current is supplied to the plating load 24 from the DC supply 10b, through the reactor 12b, the diode 18b and the IGBT 20b.

Then, the IGBTs 20a and 14b are rendered conductive and the IGBTs 20b and 14a are rendered nonconductive, a positive current flows from the DC supply 10a through the reactor 12a, the diode 18a and the IGBT 20a to the plating load 24 to plate an object to be plated. In this case, because of the turning off of the IGBT 14a, the voltage based on the energy stored in the reactor 12a is superposed on the voltage supplied by the DC power supply 10a, resulting in rapid change of the negative current flowing to the plating load 24 to the positive current. At the same time, energy is stored in the reactor 12b because the IGBT 14b is conductive.

Then, the IGBTs 20a and 14b become nonconductive again, with the IGBTs 20b and 14a rendered conductive, a negative current is supplied to the plating load 24 from the DC power supply 10b through the reactor 12b, the diode 18b and the IGBT 20b. In this case, too, the voltage generated in the reactor 12b is superposed on the voltage supplied by the DC power supply 10b, so that the change from the positive current to the negative current is rapid.

In this way, current with alternating polarity is supplied to the plating load 24, and a multi-layered printed circuit boards with through-holes and via-holes can be plated with a layer of a uniform thickness.

The power supply apparatus described above requires separate DC power supplies 10a and 10b for positive and negative currents. Also, it requires, in addition to the IGBTs 20a and 20b used to switch the main current, the auxiliary IGBTs 14a and 14b for inverting the load current at a high speed, which makes the circuit arrangement complicated, which, in turn, leads to increase of the cost of the electroplating power supply apparatuses.

In order to downsize the electroplating power supply apparatus, the DC power supplies 10a and 10b are downsized by arranging them to rectify a commercial AC signal, convert the resulting rectification output to a high-frequency signal in an inverter, and transform and rectify the high-frequency signal to a DC signal.

The value of commercial AC power supply voltage differ from country to country or from area to area. Therefore, in electroplating power supply apparatuses for use in countries or areas where AC commercial power supplies provide a "400 V group" voltage, i.e. a voltage of from 380 V to 460 V, the DC power supplies 10a and 10b require an inverter including IGBTs which can withstand a voltage resulting from rectifying the "400 V group" AC voltage. However, such IGBTs are not widely available, so they are expensive, leading to increase of the cost of the power supply apparatuses.

An object of the present invention is to provide an inexpensive power supply apparatus for use in electroplating, which can provide uniform electroplating.

SUMMARY OF THE INVENTION

An electroplating power supply apparatus according to the present invention includes an input-side rectifier for rectifying a commercial AC signal. The output signal of the input-side rectifier is converted to a high-frequency signal in a DC-to-high-frequency converter. A chopper or an inverter may be used as the DC-to-high-frequency converter. A plurality of DC-to-high-frequency converters may be used, being connected in series. When a plurality of DC-to-high-frequency converters are used, they are connected in series.

The high-frequency signal outputted by the DC-to-high-frequency converter is transformed in a transformer. The number of transformers is equal to the number of the DC-to-high-frequency converters. When plural DC-to-high-frequency converters are used, the same number of transformers are used being connected in parallel.

A first output-side rectifier is connected between the transformer and a load to rectify a transformed high-frequency signal provided from the transformer in such a way that a positive polarity current can be supplied to the load when the transformed high-frequency signal is positive in polarity. A second output-side rectifier connected in parallel with the first output-side rectifier rectifies the transformed high-frequency signal of negative polarity so that a negative polarity current can be supplied to the load. The first and second output-side rectifiers are arranged to perform full-wave or half-wave rectification.

A first semiconductor switching device is connected in series with the first output-side rectifier and is ON-OFF controlled by a lower-frequency signal at a frequency lower than that of the high-frequency signal. A second semiconductor switching device is connected in series with the second output-side rectifier and is placed in the opposite state to that of the first semiconductor switching device in accordance with the lower-frequency signal. In other words, when the first semiconductor switching device is rendered conductive, the second semiconductor switching device is rendered nonconductive by the lower-frequency signal, and vice versa.

The DC-to-high-frequency converter is so controlled in synchronization with the first and second semiconductor switching devices as to provide the high-frequency signal having a value larger during a time when the second semiconductor switching device is conductive than during a time when the first semiconductor switching device is conductive. The control of the DC-to-high-frequency converter may be done by, for example, changing the value of a reference signal for feedback control of the converter, in synchronization with the control of the first and second semiconductor switching devices.

It is preferable that the period during which the second semiconductor switching device is conductive be shorter than the period during which the first semiconductor switching device is conductive.

With the above-described arrangement, when the first semiconductor switching device is rendered conductive with the second semiconductor switching device being nonconductive, positive current is supplied to the plating load from the first output-side rectifier. On the other hand, when the second semiconductor switching device is rendered conductive with the first semiconductor switching device being nonconductive, negative current is supplied to the plating load from the second output-side rectifier. Since the DC-to-high-frequency converter is arranged to provide a larger high-frequency signal when the second semiconductor switching device is conductive, i.e. when the negative current is being supplied to the plating load, than when the first semiconductor switching device is conductive, i.e. when the positive current is being supplied to the plating load. Accordingly, the negative current has a larger value so as to perform uniform plating.

The power supply apparatus with this arrangement requires only one input-side rectifier which functions as a DC supply. In addition, this electroplating power supply apparatus requires only two semiconductor switching devices. Accordingly, the cost of the power supply apparatus can be low.

First and second reactors may be connected to the first and second semiconductor switching devices, respectively. The first and second reactors are wound on the same core so that the positive voltage applied to the plating load can increase when the second semiconductor switching device is nonconductive, and the negative voltage applied to the plating load can increase when the first semiconductor switching device is nonconductive. For example, the first reactor may be wound on the core in the direction opposite to the direction in which the second reactor is wound.

When the first and second reactors are used in the manner as stated above, during a time when the first output-side rectifier rectifies the high-frequency signal from the transformer to provide positive current to the plating load, the first reactor discharges additional positive current to the plating load. Similarly, during a time when the second output-side rectifier rectifies the high-frequency signal from the transformer to provide negative current to the plating load, the second reactor discharges additional negative current to the plating load. Accordingly, the conversion between the positive current and the negative current supplied to the plating load can be performed at a high speed, which promotes the uniform plating.

Charge storage means may be charged when current is flowing in the load. A capacitor may be used as the charge storage means, or a snubber circuit associated with the semiconductor switching device may be arranged to function additionally as the charge storage means. When one of the first and second semiconductor switching devices is rendered conductive with the other being in the nonconductive state, discharging means causes the charge storage means to discharge in such a manner that discharge current of the same polarity as the current currently flowing into the plating load flows. The discharging means may be, for example, a switch connected between the charge storage means and the plating load.

With this arrangement, a charge stored in the charge storage means when current is supplied to the plating load is discharged when the polarity of the current flowing in the plating load is reversed. The charge is discharged in the polarity after the polarity reversal. Accordingly, the current to the plating load can be reversed from the positive to negative polarity or from the negative to positive polarity so that the thickness of the resulting plated layer can be uniform.

The DC-to-high-frequency converter may include a converting semiconductor switching device and control means for ON-OFF controlling the converting semiconductor switching device. The control means provides a control signal to ON-OFF control the converting semiconductor switching device in such a manner that the difference of the positive current flowing through the plating load from a positive current reference value set for the positive current can become zero, and the difference of the negative current flowing through the plating load from a negative current reference value set for the negative current can become zero. Sample and hold means is provided for sampling and holding the control signal provided by the converting semiconductor switching device control means when the negative current flows into the plating load, and the sampled and held control signal is applied to the converting semiconductor switching device when the current flowing through the load switches from the positive to negative current.

The reason for the use of the sample and hold means is as follows. The DC-to-high-frequency converter is feedback controlled. However, when the current to the plating load is switched from, for example, positive to negative polarity, the negative current cannot change to the value corresponding to the negative current reference value simultaneously with the polarity switching since the positive current reference value and the negative current reference value differ from each other. To avoid this problem, the control signal produced when the negative current is supplied is sampled and held, and the sampled and held control signal is applied to the converting semiconductor switching device of the DC-to-high-frequency converter when the current is switched to the negative one so that the negative current can be instantaneously changed to the one corresponding to the negative current reference value. This results in uniform thickness of the plated layer.

Detecting means for detecting when the load is opened may be used together with the first and second reactors. When the detecting means detects the open-circuiting of the load, that one of the first and second reactors through which current was flowing before such detection is short-circuited by a short-circuiting semiconductor switching device.

Open-circuiting of the load for any reason causes the current flowing currently through the first or second reactor becomes zero, which, in turn, causes a large voltage generated across the first or second reactor the current flowing through which has become zero. Application of such large voltage to the first or second semiconductor switching device may cause damage to that semiconductor switching device. To avoid it, when the load is open-circuited, the reactor through which current is flowing when the load is opened is short-circuited to thereby prevent the voltage generated across it from being applied to the first or second semiconductor switching device, to thereby protect the semiconductor switching device.

The DC-to-high-frequency converter may be formed of two inverters connected in series between the output terminals of the input-side rectifier. The two inverter configuration may be used when the commercial AC power supply supplies an AC voltage to the input-side rectifier which outputs an output voltage twice the voltage each inverter can bear.

With this arrangement, semiconductor devices which can withstand a lower voltage than the DC voltage produced from the input commercial AC voltage can be used as the semiconductor switching devices of the inverters. In other words, inexpensive semiconductor devices can be used, which, in turn, can reduce the cost of the power supply apparatus.

BRIEF DESCRIPTION OF THE DRAWINGS

FIG. 1 is a cross-sectional view of a multi-layered printed circuit board;

FIG. 2 is a block circuit diagram of a prior art electroplating power supply apparatus;

FIG. 4 is a block circuit diagram of an inverter control unit of the electroplating power supply apparatus shown in FIG. 3; and FIGS. 5A and 5B respectively show how load current of the electroplating power supply apparatus shown in FIG. 3 changes and how a reference signal used in the inverter control unit shown in FIG. 4 changes.

DESCRIPTION OF PREFERRED EMBODIMENT

Figure 3:
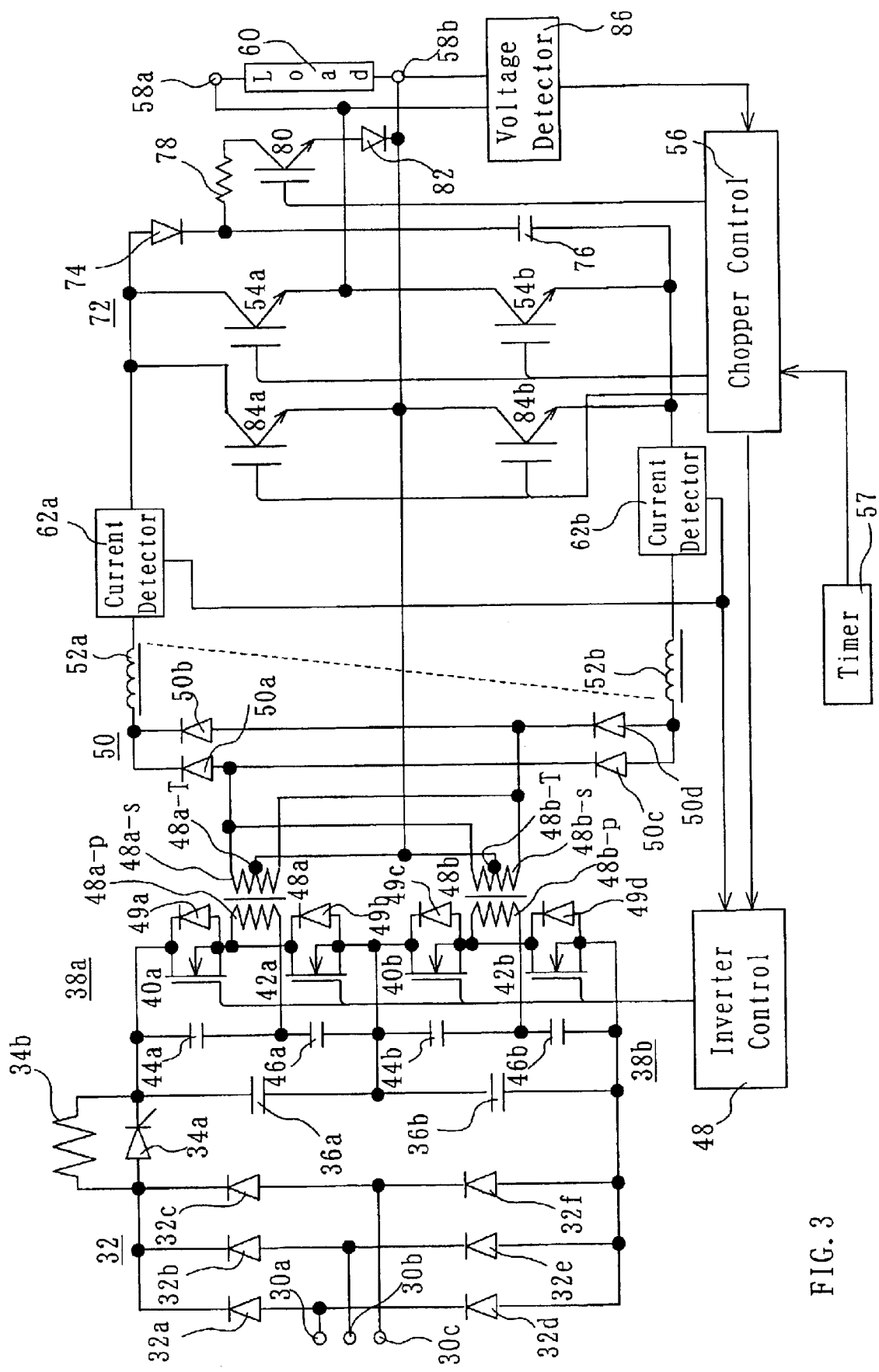
FIG. 3 is a block circuit diagram of an electroplating power supply apparatus according to an embodiment of the present invention.

A power supply apparatus for use in electroplating according to one embodiment of the present invention is shown in FIG. 3. The electroplating power supply apparatus includes input terminals, for example, terminals 30a, 30b and 30c, adapted for connection to a commercial AC power supply, for example, a three-phase commercial AC power supply. The commercial AC power supply provides, for example, a "200 V group" voltage, i.e. a voltage within a range of from 180 V to 240 V, or a "400 V group" voltage, i.e. a voltage within a range of from 380 V to 460 V.

The input terminals 30a–30c are connected to an input-side rectifier 32, which is a full-wave rectifier circuit including rectifying diodes 32a, 32b, 32c, 32d, 32e and 32f. An output of the input-side rectifier 32 is connected through a parallel combination of a thyristor 34a and a resistor 34b to a series combination of two smoothing capacitors 36a and 36b.

DC-to-high-frequency converters formed of inverters 38a and 38b, respectively, are connected in parallel with the smoothing capacitors 36a and 36b, respectively. The inverters 38a and 38b can be half-bridge type inverters. The inverter 38a is formed of semiconductor switching devices, e.g. MOSFETs, 40a and 42a, and capacitors 44a and 46a, and the inverter 38b is formed of semiconductor switching devices, e.g. MOSFETs, 40b and 42b, and capacitors 44b and 46b. In place of the half-bridge inverter, a full-bridge inverter may be used.

Each of the MOSFETs 40a, 40b, 42a and 42b is switched on and off at a high frequency in response to an inverter control signal applied to the gate electrode thereof from an inverter control unit 48, whereby a DC voltage produced across each of the smoothing capacitors 36a and 36b is converted to a high-frequency voltage of, for example, 20 KHz to 100 KHz. Flywheel diodes 49a, 49b, 49c and 49d are connected in anti-parallel with the drain-source conduction paths of the MOSFETs 40a, 42a, 40b and 42b, respectively.

High-frequency voltages from the inverters 38a and 38b are applied across the primary windings 48a-p and 48b-p, respectively, of transformers 48a and 48b, whose secondary windings 48a-s and 48b-s are connected in parallel. The secondary windings 48a-s and 48b-s have intermediate taps 48a-T and 48b-T, respectively, which are connected together.

A transformed high-frequency voltage developed across the parallel combination of the secondary windings 48a-s and 48b-s is rectified in an output-side rectifier 50, which includes diodes 50a, 50b, 50c and 50d. The secondary windings 48a-s and 48b-s have upper ones of their terminals of the secondary windings 48a-s and 48b-s connected together to the junction of the anode of the diode 50a and the cathode of the diode 50c, and have their lower terminals connected together to the junction of the anode of the diode 50b and the cathode of the diode 50d.

The outputs of the output-side rectifier 50 are connected to opposite ends of a series combination of semiconductor devices, for example, IGBTs 54a and 54b, through smoothing reactors 52a and 52b, respectively. The reactors 52a and 52b include windings wound on the same core, but in opposite directions. Therefore, when, for example, current flowing through the reactor 52a to the IGBT 54a stops, current flows through the smoothing reactor 52b toward the diodes 50c and 50d. On the other hand, when current flowing through the reactor 52b toward the diodes 50c and 50d stops, current flows through the reactor 52a toward the IGBT 54a.

The IGBT 54a and the reactor 52a, and the IGBT 54b and the reactor 52b form choppers. The IGBTs 54a and 54b are ON-OFF controlled by a chopper control signal supplied from a chopper control unit 56. The conduction and non-conduction periods of the IGBTs 54a and 54b are determined through a timer 57 associated with the chopper control unit 56. The conduction period of the IGBT 54a is set to be longer than the period during which the IGBT 54b is conductive. For example, the period from the time the IGBT 54b starts conducting to the time it next starts conducting is about 5 milliseconds to about 20 milliseconds.

The junction of the IGBTs 54a and 54b is connected to an output terminal 58a of the power supply apparatus. The other output terminal 58b is connected to the mutually connected intermediate taps 48a-T and 48b-T on the secondary winding 48a-s and 48b-s of the transformers 48a and 48b. The output terminals 58a and 58b are connected to a plating load 60.

When the IGBT 54a is conductive, with the upper terminals of the secondary windings 48a-s and 48b-s being more positive than the mutually connected intermediate taps 48 a-T and 48b-T, current flows from the upper terminals through the diode 50a into the load 60. On the other hand, if the lower terminals of the secondary windings 48a-s and 48b-s are more positive than the intermediate taps 48a-T and 48b-T, current flows from the lower terminals through the diode 50b to the load 60.

When the IGBT 54b is conductive, with the upper terminals of the secondary windings 48a-s and 48b-s being more negative than the mutually connected intermediate taps 48a-T and 48b-T, current flowing from the intermediate taps 48a-T and 48b-T to the load 60 returns to the upper terminals through the rectifying diode 50c. If the lower terminals of the secondary windings 48a-s and 48b-s are more negative than the intermediate taps 48a-T and 48b-T, the current flowing from the intermediate taps 48a-T and 48b-T to the load 60 returns to the lower terminals through the rectifying diode 50d.

Thus, the diodes 50a and 50b function together as a first output-side rectifier, while the diodes 50c and 50d function together as a second output-side rectifier.

A positive current detector 62a is connected between the reactor 52a and the IGBT 54a for detecting the value of the current (hereinafter referred to as positive current) flowing toward the IGBT 54a. Similarly, a negative current detector 62b is connected between the reactor 52b and the IGBT 54b for detecting the value of the current (hereinafter referred to as negative current) flowing toward the reactor 52b. The positive and negative current detectors 62a and 62b develop positive and negative current value representative signals, respectively, which are coupled to the inverter control unit 48.

As shown in FIG. 4, the inverter control unit 48 includes an error amplifier 66, which develops an error signal representative of the difference between the positive or negative current value representative signal from the current detector 62a or 62b, and a reference signal provided by a reference signal source 64. A PWM driver 68 provides a PWM-type inverter control signal to the inverters 38a and 38b for controlling the inverters in such a manner as to make the error signal become zero.

The reference signal from the reference signal source 64 is a pulse signal as shown in FIG. 5B and has base portions B and peak portions P. The pulse signal is synchronized by a signal from the chopper control unit 56 with the turning-on and turning-off of the IGBTs 54a and 54b. Specifically, when the positive current flows because of the conduction of the IGBT 54a and the non-conduction of the IGBT 54b, the base portion B of the pulse signal occurs. When the IGBT 54a is nonconductive, the IGBT 54b is conductive, and, therefore, the negative current flows, the peak portion P occurs in the pulse signal. Since the pulse signal is synchronized with the turning on and off of the IGBTs 54a and 54b, the period between the rising edge of one peak portion B to the rising edge of the next adjacent peak portion P is, for example, from 5 milliseconds to 20 millisecond, which is significantly longer than the period of the high-frequency signal from the inverters 38a and 38b.

A sample and hold circuit 70 is provided in association with the error amplifier 66. The sample and hold circuit 70 is responsive to the signal from the chopper control unit 56 by sampling and holding the error signal produced by the error amplifier 66 when the IGBTs 54a and 54b are non-conductive and conductive, respectively, i.e. when the peak portion P occurs in the reference signal. When the IGBTs 54 and 54b are next rendered nonconductive and conductive, the sample and hold circuit 70 provides the error signal which it holds to the PWM driver 68 in response to the signal from the chopper control unit 56.

In the circuit shown in FIG. 3, a snubber circuit 72 is connected in parallel with a series combination of the collector-emitter conduction paths of the IGBTs 54a and 54b. The snubber circuit 72 includes a series combination of a diode 74 and charge storage means, e.g. a capacitor 76 and absorbs an excessive voltage produced by the reactor 52a or 52b when IGBT 54a or 54b is rendered nonconductive. Between the junction of the diode 74 and the capacitor 76 and the output terminal 58b, a series combination of a resistor 78, the collector-emitter conduction of a semiconductor switching device, e.g. an IGBT 80, and a reverse current blocking diode 82 is connected. When an ON signal is applied to the gate of the IGBT 80 from the chopper control unit 56, the IGBT 80 becomes conductive, and a charge on the capacitor 76 is discharged to the output terminal 58b.

The collector-emitter conduction path of an IGBT 84a, operating as a semiconductor switching device, is connected between the junction of the positive current detector 62a and the collector of the IGBT 54a and the output terminal 58b. Similarly, the emitter of an IGBT 84b, operating as a semiconductor switching device, is connected to the junction of the negative current detector 62b and the emitter of the IGBT 54b, with the collector of the IGBT 84b connected to the output terminal 58b. When the IGBTs 84a and 84b receive at the respective bases an ON signal from the chopper control unit 56, they become conductive to thereby connect the reactors 52a and 52b to the output terminal 58b, respectively. When a voltage detector 86 connected between the output terminals 58a and 58b detects a zero voltage between the output terminals 58a and 58b, the chopper control unit 56 develops the ON signal.

The operation of the electroplating power supply apparatus with the above-described arrangement is described with reference to FIGS. 5A and 5B. When a commercial AC power supply is connected to the input terminals 30a–30c of the power supply apparatus at a time t1 shown in FIG. 5A, the thyristor 34a is open, and, therefore, the output of the input-side rectifier 32 is supplied through the resistor 34b to the capacitors 36a and 36b, resulting in charging of the capacitors 36a and 36b. When the charging is completed, the thyristor 34a is rendered conductive, and after that, the output of the input-side rectifier 32 is supplied through the thyristor 34a to the smoothing capacitors 36a and 36b, so that the rectifier output is smoothed into a DC voltage.

The DC voltages across the smoothing capacitors 36a and 36b are applied to the inverters 38a and 38b, respectively, where they are converted into high-frequency voltages, which, in turn, are applied to the primary windings 48a-p and 48b-p of the transformers 48a and 48b. Transformed high-frequency voltages are induced in the secondary windings 48a-s and 48b-s.

In this state, if the IGBTs 54a and 54b are rendered conductive and nonconductive, respectively, by the chopper control unit 56 in synchronization with the reference signal provided by the inverter control unit 48, the value of the high-frequency voltages induced in the secondary windings 48a-s and 48b-s are smaller because, in this state, it is the base portion B (FIG. 5B) that occurs in the reference signal.

In this state, if the voltages induced at the upper terminals of the secondary windings 48a-s and 48b-s are higher than the voltages at the intermediate terminals 48a-T and 48b-T, a smaller, positive current shown in FIG. 5A flows through the diode 50a, the reactor 52a, the positive current detector 62a, the IGBT 54a, the output terminal 58a, the plating load 60, the output terminal 58b to the intermediate terminals 48a-T and 48b-T.

If voltages higher than the voltages at the intermediate terminals 48 a-T and 48b-T are present at the lower terminals of the secondary windings 48a-s and 48b-s, a smaller, positive current, shown in FIG. 5A, flows through the diode 50b, the reactor 52a, the positive current detector 62a, the IGBT 54a, the output terminal 58a, the plating load 60, the output terminal 58b to the intermediate terminals 48a-T and 48b-T.

The positive current is detected by the positive current detector 62a, which provides a positive current value representative signal to the inverter control unit 48. The inverter control unit 48 controls the conduction periods of the MOSFETs 40a, 40b, 42a and 42b in such a manner that the positive current can have a value corresponding to the base portion B of the reference signal (FIG. 5B).

Because of the flow of the positive current, the capacitor 76 of the snubber circuit 72 is also charged.

At a time t2 shown in FIG. 5A, the chopper control unit 56 renders the IGBT 54a nonconductive and IGBT 54b conductive. The reference signal from the inverter control unit 48 changes to the peak portion P shown in FIG. 5B, the high-frequency voltages induced in the secondary windings 48a-s and 48b-s have a larger value.

In this state, if the voltages at the intermediate taps 48a-T and 48b-T on the secondary windings 48a-s and 48b-s are higher than the upper terminals of the secondary windings, a negative current flows from the mutually connected intermediate terminals 48a-T and 48b-T through the output terminal 58b, the plating load 60, the output terminal 58a, the IGBT 54b, the negative current detector 62b, the smoothing reactor 52b, and the diode 50c to the mutually connected upper terminals of the secondary windings 48a-s and 48b-s.

If the voltage at the mutually connected intermediate taps 48a-T and 48b-T is higher than the voltage of the mutually connected lower terminals of the secondary windings 48a-s and 48b-s, a negative current flow from the intermediate taps 48a-T and 48b-T through the output terminal 58b, the plating load 60, the output terminal 58a, the IGBT 54b, the negative current detector 62b, the smoothing reactor 52b and the diode 50d to the mutually connected lower terminals of the secondary windings 48a-s and 48b-s. The negative current is detected by the negative current detector 62b, and the negative current value representative signal is applied from the detector 62b to the inverter control unit 48. Then, the inverter control unit 48 controls the conduction periods of the MOSFETs 40a, 42a, 40b and 42b of the inverters 38a and 38b in such a manner that the detected negative current assumes the value corresponding to the peak portion P of the reference signal.

Due to the switching from the positive current to the negative current, the current flowing through the plating load 60 changes from the smaller, positive current to the larger, negative current, as shown in FIG. 5A. No current flowing through the smoothing reactor 52a, through which the positive current has been flowing, induces in the smoothing reactor 52b, a current which tends to flow into the diodes 50c and 50d, which adds to the negative current. This accelerates the change from the positive current to the negative current.

At time t2, the chopper control unit 56 renders the IGBT 80 conductive, whereby a positive charge on the capacitor 76 flows through the output terminal 58b, the plating load 60, the output terminal 58a, the IGBT 54b, the negative current detector 62b, the smoothing reactor 52b, and the diode 50c or 50d. Then, the negative current increases, accordingly. This further accelerates the positive to negative current change. The negative current melts the plated layer on the edges of the through-holes and via-holes, so that uniform electroplating can be realized.

At time t3 in FIG. 5A, the IGBTs 54a and 54b are rendered conductive and nonconductive, respectively, again, so that the positive current can flow as described previously, and the inversion from the negative to positive current takes place. The period during which the negative current flows is shorter than the period during which the positive current flows, and the negative current is larger than the positive current. Due to the positive current starting to flow, the negative current which has been flowing through the reactor 52b ceases, while the positive current starts to flow through the reactor 52a toward the IGBT 54a. This negative to positive current change takes place rapidly. At the same time, the capacitor 76 is charged.

In a similar way, positive and negative currents are alternately supplied to the plating load 60. Due to repetitive supply of a negative current having a larger value for a shorter period than a positive current to the plating load 60, the object to be plated in the plating load 60 can be plated with a layer of uniform thickness. When the positive current flow changes to the negative current flow and when the negative current flow changes to the positive current flow, a negative current and a positive current induced respectively in the smoothing reactors 52b and 52a are superposed, which accelerates the inversion of the current flow. In addition, when the positive current changes to the negative current, current based on the charge on the capacitor 76 is added to the negative current in a sense to increase the negative current. Accordingly, the speed of the inversion from the positive to negative current is further increased.

With the arrangement described above, the difference in value between the positive current and the negative current is large. Therefore, unless the response of the inverters 38a and 38b are fast, it would take a long time for the current to attain the desired negative value, which would result in insufficient melting of the plated layer on the object. It is, therefore, necessary for the inverters 38a and 38b to have an increased response. For that purpose, the sample and hold circuit 70 in the inverter control unit 48 shown in FIG. 4 operates to sample and hold the error signal developed when the negative current is being supplied, and supplies the error signal it has held to the PWM driver 68 when a command for the positive to negative current inversion is developed. With this arrangement, the response of the inverters 38a and 38b can be increased so that the high-frequency voltages developed in the inverters 38a and 38b can be converted to high voltages for supplying the negative current without delay.

The plating load 60 includes, in addition to the object to be plated, a hanger for handing the object to be plated, and other things. Sometimes, it may occur that the contact between the hanger and the object is broken, resulting in open-circuiting of the plating load 60. This would cause zero current to flow through the positive current detector 62a and the negative current detector 62b, which, in turn, causes the inverters 38a and 38b to be controlled in such a ways that a maximum voltage can be developed between the output terminals 58a and 58b. At the same time, large voltages would be induced in the reactors 52a and 52b because the currents which have been flowing therethrough no longer flow. This would cause excessive voltages to be applied to the IGBTs 54a and 54b, which may damage the IGBTs 54a and 54b. In addition, if, under this situation, the open-circuiting of the plating load 60 disappears, excessive current would flow into the plating load 60.

In order to avoid it, the voltage detector 86 is arranged to detect an excessive voltage caused by the open-circuiting of the plating load 60. When the voltage detector 86 detects such excessive voltage, it develops a signal indicating the development of such excessive voltage, which is applied to the chopper control unit 56. In response to it, the chopper control unit 56 renders conductive that one of the IGBTs 84a and 84b which is connected to the reactor 52a or 52b through which the current has been flown, to thereby short-circuit that reactor. This prevents an excessive voltage from being applied to the IGBTs 54a and 54b, and also prevents excessive current from being supplied to the plating load 60 when the open-circuiting disappears.

Since the inverters 38a and 38b are connected in series, it is not necessary to use, as the MOSFETs 40a, 40b, 42a and 42b, MOSFETs which can withstand a voltage resulting from rectifying a 400 V group commercial AC voltage even when the power supply apparatus is intended for use with a commercial AC power supply supplying a 400 V group voltage, but they need to withstand only a voltage resulting from rectifying a 200 V group AC voltage. Needless to say, the power supply apparatus can be used with a 200 V group commercial AC power supply, too.

The described power supply apparatus includes two inverters, namely the inverters 38a and 38b, so that it can be used with not only a commercial AC power supply supplying a 200 V group AC voltage but also with a commercial AC power supply supplying a 400 V group AC voltage. However, a power supply apparatus for use with only a 200 V group commercial AC power supply needs only one inverter. In this case, the number of the transformers may be reduced to one, with only two diodes used for the output-side rectifier, namely, the diodes 50a and 50b in the circuit shown in FIG. 3.

In the above-described embodiment, the current detectors 62a and 62b are connected in series with the reactors 52a and 52b, respectively, but they may be connected between the intermediate taps 48a-T 48b-T and the output terminal 58b, respectively.

In the above-described embodiment, the capacitor 76 is arranged to be discharged only when the positive current changes to the negative current. However, another diode equivalent to the diode 74 may be used, with its cathode connected to the junction of the capacitor 76 and the diode 74 and with its anode connected to the output terminal 58b, so that the capacitor 76 can be charged when the negative current is being supplied, too. In this case, a series combination of a resistor, an IGBT and a reverse current blocking diode, equivalent to the series connection of the resistor 78, the IGBT 80 and the reverse current blocking diode 82, is additionally connected between the junction of the capacitor 76 and the diode 74 and the output terminal 58a. When the IGBT 80 is rendered conductive, the IGBT in the equivalent series combination is also made conductive so that the charge on the capacitor 76 can be supplied also when the current changes from negative to positive, which increases the speed of the negative to positive current change, too. It should be noted that it is not always necessary to use both current change acceleration arrangements, but only one of them, namely, the arrangement shown in FIG. 3 for causing the capacitor 76 to discharge only when the current changes from positive to negative, or the added arrangement described just above for causing the capacitor 76 to discharge only when the current changes from negative to positive, may be employed.

Instead of the voltage detector 86, a current detector may be used for detecting open-circuiting of the plating load 60.

A chopper may be used in place of an inverter as the DC-to-high-frequency converter.

Further, in place of IGBTs 54a and 54b, MOSFETs or bipolar transistors may be used. Also, in place of MOSFETs, IGBTs or bipolar transistors may be used to form the inverters 38a and 38b.

What is claimed is:

1. A power supply apparatus, comprising:
    an input-side rectifier adapted for rectifying commercial AC power;
    a DC-to-high-frequency converter for converting an output of said input-side rectifier to a high-frequency signal;
    a transformer for transforming a high-frequency signal from said DC-to-high-frequency converter and developing a high-frequency transformer output signal;
    a first output-side rectifier connected between said transformer and a load for so rectifying said high-frequency transformer output signal as to cause a positive current to flow in said load when said high-frequency transformer output signal is of positive polarity;
    a second output-side rectifier connected in parallel with said first output-side rectifier for so rectifying said high-frequency transformer output signal as to cause a negative current to flow in said load when said high-frequency transformer output signal is of negative polarity;
    a first semiconductor switching device connected in series with said first output-side rectifier;
    a second semiconductor switching device connected in series with said second output-side rectifier; and
    a switching device controller for supplying said first and second semiconductor switching devices with such semiconductor switching device control signals as to render said first semiconductor switching device alternately conductive and nonconductive at a frequency lower than that of said high-frequency signal and to render said second semiconductor switching device alternately conductive and nonconductive in a complementary manner to said first semiconductor switching device;
    said DC-to-high-frequency converter comprising converter semiconductor switching means, conversion control means for rendering said converter semiconductor switching means alternately conductive and nonconductive, and a reference signal source providing a reference signal assuming, in synchronization with said semiconductor switching device control signals, reference values for positive and negative currents when said first and second semiconductor switching devices are conductive, respectively, said reference value of said reference signal for negative current being larger than said reference value for positive current;

said conversion control means supplying said converter semiconductor switching means with such a conversion control signal as to make a difference between said positive current flowing through said load and said reference value for positive current zero and to make a difference between said negative current flowing through said load and said reference value for negative current zero.

2. The power apparatus according to claim 1 wherein said power supply apparatus further comprises sample-and-hold means for sampling and holding said conversion control signal provided by said conversion control means when said negative current flows through said load, and for supplying the sampled and held conversion control signal to said converter semiconductor switching means when the current flowing through said load changes from a positive current to a negative current.

3. The power apparatus according to claim 1 wherein said converter switching means comprises two inverters connected in series between output terminals of said input-side rectifier, and said input-side rectifier is to be connected to such a commercial AC power supply that said input-side rectifier can provide a rectified output voltage which is about two times as large as the voltage which each of said inverters can handle.

4. A power supply apparatus comprising:
an input-side rectifier adapted for rectifying commercial AC power;
a DC-to-high-frequency converter for converting an output of said input-side rectifier to a high-frequency signal;
a transformer for transforming a high-frequency signal from said DC-to-high-frequency converter and developing a high-frequency transformer output signal;
a first output-side rectifier connected between said transformer and a load for so rectifying said high-frequency transformer output signal as to cause a positive current to flow in said load when said high-frequency transformer output signal is of positive polarity;
a second output-side rectifier connected in parallel with said first output-side rectifier for so rectifying said high-frequency transformer output signal as to cause a negative current to flow in said load when said high-frequency transformer output signal is of negative polarity;
a first semiconductor switching device connected in series with said first output-side rectifier and rendered conductive and nonconductive at a frequency lower than that of said high-frequency signal;
a second semiconductor switching device connected in series with said second output-side rectifier, said second semiconductor switching device being rendered nonconductive when said first semiconductor switching device is conductive and rendered conductive when said first semiconductor switching device is nonconductive;
said DC-to-high-frequency converter being so controlled in synchronization with said first and second semiconductor switching devices that said high-frequency signal can have a value which is larger when said second semiconductor switching device is conductive than when said first semiconductor switching device is conductive;

said power supply apparatus further comprising charge storage means charged when current is being applied to said load, and discharging means responsive to turning on of one of said first and second semiconductor switching devices for discharging said charge storage means in such a manner that discharge current of the same polarity as the current currently flowing through said load can flow.

5. The power supply apparatus according to claim 4 further comprising:
detecting means for detecting when said load is open-circuited; and
short-circuiting semiconductor switching device for short-circuiting that one of said first and second reactors through which current is flowing when said detecting means detects the open-circuiting of said load.

6. A power supply apparatus comprising:
an input-side rectifier adapted for rectifying commercial AC power;
a DC-to-high-frequency converter for converting an output of said input-side rectifier to high-frequency signal;
a transformer for transforming a high-frequency signal from said DC-to-high-frequency converter and developing a high-frequency transformer output signal;
a first output-side rectifier connected between said transformer and a load for so rectifying said high-frequency transformer output signal as to cause a positive current to flow in said load when said high-frequency transformer output signal is of positive polarity;
a second output-side rectifier connected in parallel with said first output-side rectifier for so rectifying said high-frequency transformer output signal as to cause a negative current to flow in said load when said high-frequency transformer output signal is of negative polarity;
a first semiconductor switching device connected in series with said first output-side rectifier and rendered conductive and nonconductive at a frequency lower than that of said high-frequency signal;
a second semiconductor switching device connected in series with said second output-side rectifier, said second semiconductor switching device being rendered nonconductive when said first semiconductor switching device is conductive and rendered conductive when said first semiconductor switching device is nonconductive;
said DC-to-high-frequency converter being so controlled in synchronization with said first and second semiconductor switching devices that said high-frequency signal can have a value which is larger when said second semiconductor switching device is conductive than when said first semiconductor switching device is conductive;
said power supply apparatus further comprising first and second reactors connected respectively to said first and second semiconductor switching devices;
said first and second reactors being wound on a same core in such a manner that when said second semiconductor switching device is nonconductive, a positive voltage to be applied to said load can be increased, and when said first semiconductor switching device is nonconductive, a negative voltage to be applied to said load can be increased.

* * * * *